United States Patent
Ewald

[15] 3,682,065
[45] Aug. 8, 1972

[54] PHOTOGRAPHIC FILM PACK

[72] Inventor: William P. Ewald, 479 Weidel Road, Webster, N.Y.

[22] Filed: May 8, 1970

[21] Appl. No.: 35,784

[52] U.S. Cl. ............................................95/31 FM
[51] Int. Cl. ..........................................G03b 19/04
[58] Field of Search..............95/31 R, 31 FM, 31 CO

[56] References Cited

UNITED STATES PATENTS

| | | | |
|---|---|---|---|
| 2,557,297 | 6/1951 | Lea | 95/31 R |
| 3,324,778 | 6/1967 | Everett | 95/31 R |
| 3,425,776 | 2/1969 | Mayr | 352/172 X |

Primary Examiner—Samuel S. Matthews
Assistant Examiner—Monroe H. Hayes
Attorney—Walter O. Hodsdon and Robert F. Cody

[57] ABSTRACT

A film cartridge containing a roll of conventional photographic film—adapted for use in cameras of the instant processing variety, and which cameras may not have a film advancing and metering facility—is disclosed as having a built-in film advancing and metering strip. The strip is adapted to be pulled out of the cartridge/camera to wind up exposed film, and such strip contains thereon film frame indicia which is viewed as it is pulled out of the cartridge/camera.

8 Claims, 8 Drawing Figures

PATENTED AUG 8 1972 3,682,065

WILLIAM P. EWALD
INVENTOR.

BY *Walter O. Hodson*
*Robert J. Cody*
ATTORNEYS

WILLIAM P. EWALD
INVENTOR.

ATTORNEYS

PHOTOGRAPHIC FILM PACK

BACKGROUND OF THE INVENTION

1. Field of the Invention

The invention relates in general to cartridges or packs of conventional photographic film, i.e., film which is not of the instant processing type, and which cartridges or packs have film supply and film takeup sections. More particularly, the invention provides a way to advance and meter roll film within such cartridges or packs so that they may be employed, for example, in cameras of the instant processing type, and in which cameras there may not be any film advancing or metering provisions for roll film.

2. Description Relative to the Prior Art

It frequently will happen that the owner of a camera of the instant processing type would prefer to process film well after it has been exposed, rather than do on-site processing. Such later processing has the advantage of permitting the development of film under laboratory conditions; and permits the use of films of various and different types, depending on the subject(s) to be photographed. In addition, on-site processing may be difficult to manipulate, and to implement, if the photographer has had to get himself, physically, into an awkward position just to be able to snap his pictures. And, in many instances, a photographer—especially one taking a large number of pictures—will prefer to process his pictures later, rather than be forced to carry, and care for, processed prints while still trying to take additional pictures.

Cameras which have been designed for photography of the instant processing variety are ordinarily not equipped with means and mechanisms for advancing roll film from supply-to-takeup. Thus, the problem obtains as to how to advance film within a pack thereof when the using camera has no film advancing means; and in particular, how to assure that step-by-step film advancing occurs in equisized steps, even though the film roll takeup diameter gradually increases as the film is advanced.

Admittedly, packs of roll film with supply and takeup portions are old in the art. So too, the problem of advancing roll film (though not in a pack) within a camera having no film advancing mechanism is old in the art in view of U.S. Pat. No. 3,412,662. Such prior art, however, does not confront the problem which is the basis for the present invention, viz, advancing and metering packed roll film within a camera which is not designed to handle such film.

SUMMARY OF THE INVENTION

Whereas the prior art teaches the design of cameras to accommodate specially packed film, the invention, on the other hand, teaches the special packing of film to be employed with cameras having neither film advancing mechanisms, nor viewing windows through which indicia on film backing paper may be seen.

The invention provides a film pack with built-in film advancing and metering means. A film pack according to the invention does not require a viewing window therein; and use of the film pack according to the invention does not require that the using camera be provided with a viewing window. In fact, film packs in accordance with one presently preferred form of the invention do not require backing paper for the film within such packs, and thus may be wound into smaller rolls.

The essence of the invention is the use, in a film pack of the indicated type, a film advancing and metering strip having frame indicia thereon. (As used herein, the term "strip" is meant to include any web or string.) The strip is adapted to extend to the outside of the using camera; and the frame indicia on the strip is viewable only when, and as, the strip is withdrawn from the using camera. Thus, the need for viewing windows in the pack and camera is obviated; and attendantly, film packs as described herein may be employed with cameras of the instant processing type.

OBJECT(S) OF THE INVENTION

To provide a photographic film pack having a roll of conventional film therein; which pack has its own built-in film advancing and metering means; and which pack may be used in a camera of the instant processing type.

The invention will be described with reference to the figures, wherein

Figure 1:
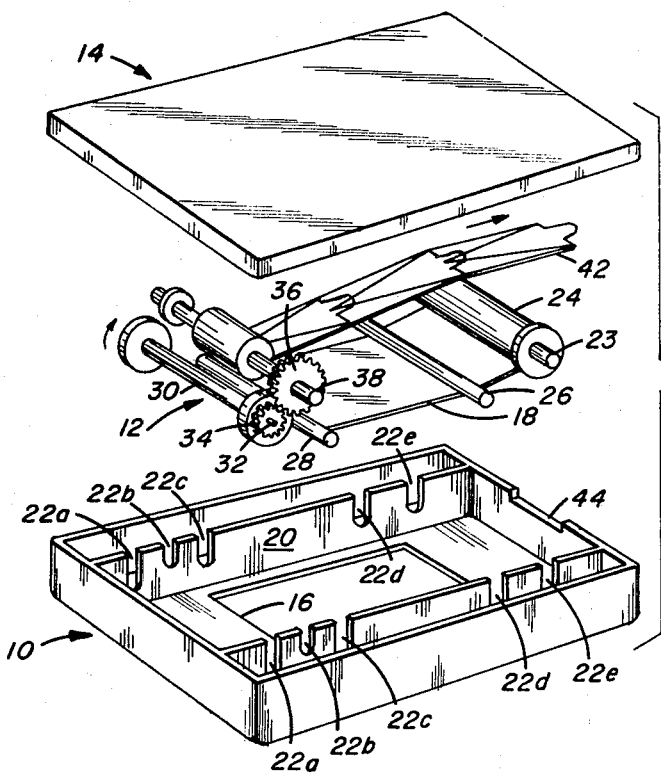
FIG. 1 is a perspective view illustrating an embodiment of the invention.

With reference to FIG. 1, a film pack adapted for use in cameras of the instant processing type is comprised of three main parts, viz, a casing 10, a film and metering assembly 12, and a cover 14. The casing 10 has an aperture 16 through which the film 18 of the film and metering assembly 12 may be exposed; and supported within the casing 10 are ribs 20 having paired cutouts 22 (a through e).

The cutouts 22e are adapted to provide bearing support for the axle 23 of a roll 24 of conventional photographic film. The film roll 24 may have a cover sheet leader, and trailer, to prevent the inadvertent exposure of the film within the pack. Guide bars 26, 28 serve to hold the film 18 flat within an exposure plane; and such guide bars are supported, respectively, within the cutouts 22d and 22c.

A takeup spool 30, having an axle 32, serves to wind up the film 18 after it has been exposed. The axle 32, which is supported within the cutouts 22a, supports a pinion gear 34. The pinion gear 34 is adapted to mesh with a metering drive gear 36 on a drive shaft 38; and the drive shaft 38 is supported within the cutouts 22c.

So that film advancing and metering may obtain without mechanisms of and within a camera, a film pack according to the invention is provided with a metering strip 42. The strip 42 is wound about the axle 38; and such strip is provided with indicia corresponding to picture frames within the film of the roll 24. The strip 42 is adapted to be pulled through a slot 44 within the pack; and thence through a slot within the using camera. Pulling the strip 42 causes the drive shaft 38 to rotate, causing the gear 36 to drive the takeup spool 30.

To be noted in FIG. 1 is that the film pack cover 14 is indicated as having no window through which metering marks may be seen. Such a showing has been made to emphasize that the concept of the invention is not at all akin to the prior art use of "little red windows" through which film backing paper may be viewed for markings thereon. Rather, the invention provides that the respective metering indicia for, and corresponding to, a given picture frame is viewable only as, and after, the respective parts of the strip have been pulled to the outside of the using camera; and it is because of this feature that film packs according to the invention may be employed in cameras of the instant processing type.

Figure 2:
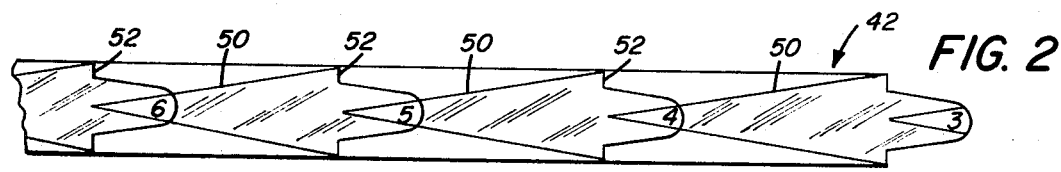
FIGS. 2 and 3 are views illustrating metering strips useful for practicing the invention.
Figure 3:
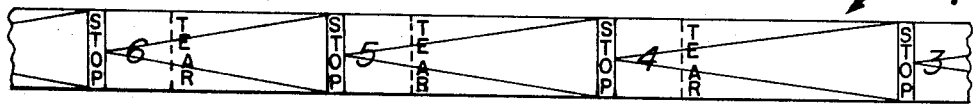

The film advancing and metering strips of FIGS. 2 and 3 have a common theme in that converging lines 50 point to discrete stop locations 52 along the lengths of such strips. A photographer, in advancing film, say, from frame 3 to frame 4 will seize the strip 42 and pull it through the camera, watching as lines 50 converge (to assist in preventing an over-advance) to stop the film advance at the respective stop location 52. Special notation should be made of the fact that the distances between the strip stop locations 52 gradually decrease, thereby to compensate for the gradually increasing diameter of the takeup roll, and decreasing diameter of the strip roll, and thus assure that the exposure frames will be evenly spread along the length of the film within the roll 24.

Figure 4:
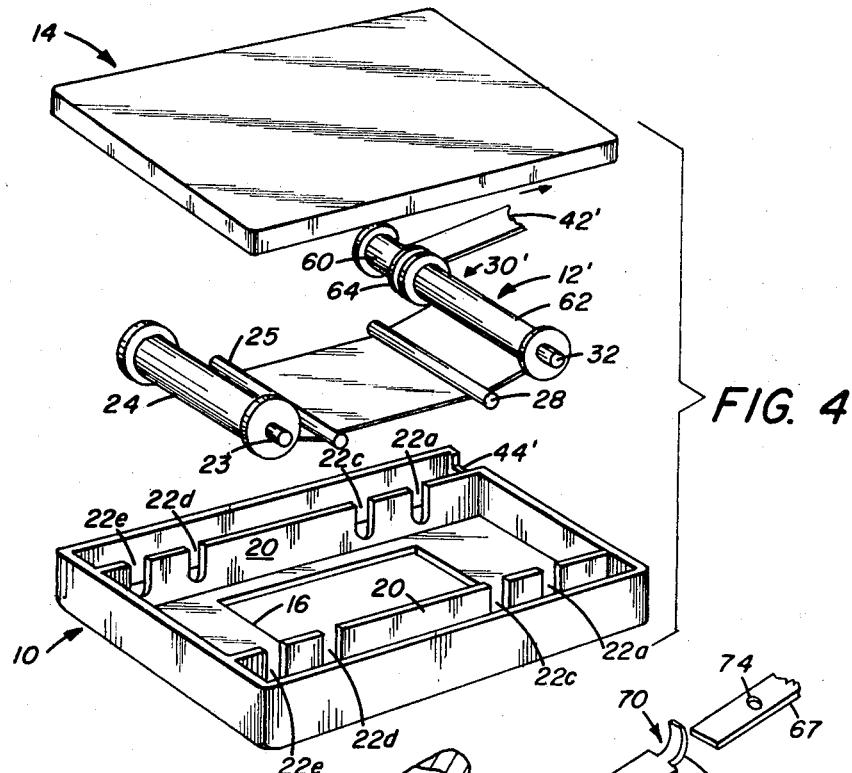
FIG. 4 is a perspective view illustrating another embodiment of the invention.
Figure 5:
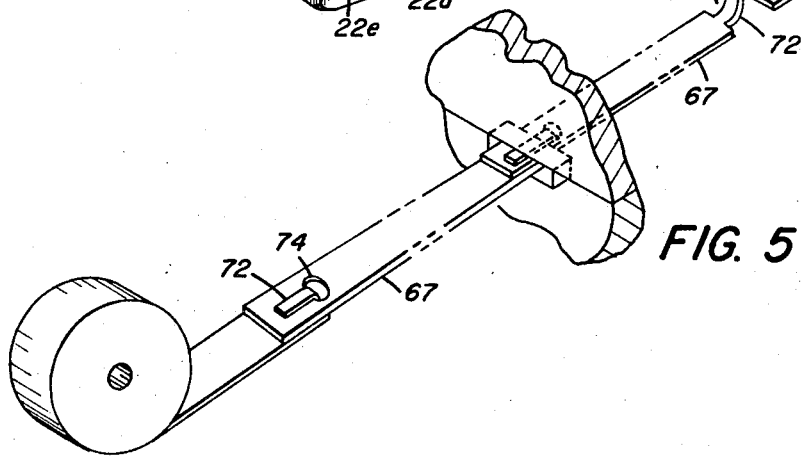
FIG. 5 is a perspective view illustrating the principle of metering which is presently for practicing the invention.

Reference should now be had to the film pack indicated in FIG. 4 (and FIG. 5). Except as otherwise indicated, e.g., by primes, the corresponding parts of the film packs of FIGS. 1 and 4 are similarly numbered; and emphasis in the following description is directed to those features of the FIG. 4 film pack which are not incorporated in the film pack of FIG. 1:

The takeup spool 30' of the FIG. 4 film pack is provided with a flanged metering part 60 that is coaxial with a flanged takeup 62. A space 64 is provided between the adjacent flanges of the spool parts 60, 62 so that the flanges may straddle one of the ribs 20 when the spool 30' is set into its bearing cutouts 22a. The flanges metering part 60 of the spool 30' has a metering strip 42' wound thereon; and such strip may be pulled through a slot 44' of the film pack to advance and meter the takeup of film within the pack.

Whereas the film advancing and metering strips of FIGS. 2 and 3 necessitate visual control of metering, e.g., by watching converging lines as they exit from the using camera, the invention in its presently preferred form employs a strip that is, in effect, an interlaced arrangement of discrete strips 67, each having a respective length. (See FIG. 5.) Each discrete strip 67—having its own respective frame indicia 70 thereon—has a lead part 72 that hooks through, and folds back from, an orifice 74 in the trailing part of an adjacent discrete strip 67. Means may be provided within the pack to assure that the discrete strips 67 cannot pull apart until their respective interlacings have been pulled to the outside of the pack/camera. Thus, the film advancing and metering strip of FIG. 5, like those described in connection with the pack of FIG. 1, obviates the need within a pack and/or a camera for a "little red window" through which film backing paper may be viewed; and attendantly, a pack of conventional film obtains which may be inserted into and used within a camera of the instant processing type.

Figure 6:
FIGS. 6 through 8 illustrate variations of the metering theme indicated in FIG. 5.
Figure 7:
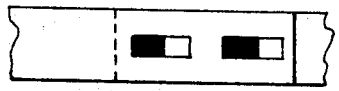
Figure 8:
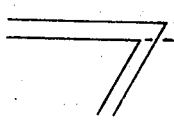

The invention has been described in detail with particular reference to preferred embodiments thereof, but it will be understood that variations and modifications can be effected within the spirit and scope of the invention. FIGS. 6 and 7, for example, indicate respective ways to interlace discrete film strips, i.e., by folding back hinged punches in the manner indicated in FIG. 8.

What is claimed is:

1. In a photographic apparatus having an exposure aperture, and a slot therein, and adapted to receive
   a. a roll of photographic film, and
   b. a takeup spool for advancing said film past said exposure aperture, the improvement comprising
      1. rotatable means drivingly coupled to said takeup spool for rotationally driving said takeup spool, and
      2. a flexible strip wound in a roll on and about said rotatable means, and threaded through said slot to the outside of said photographic apparatus, whereby as the strip is pulled and unwound from said rotatable means, the takeup spool is caused to wind up film drawn from the said roll thereof.

2. The apparatus of claim 1 wherein said strip is provided with frame identifying indicia so disposed along its length that, as the strip is withdrawn from the said apparatus, film frames successively appear in the said aperture which correspond to the said indicia which exits from the said apparatus.

3. The apparatus of claim 2 wherein the strip spacings between the said frame identifying indicia gradually decrease from one end of the strip to the other, thereby to compensate for the decreasing roll diameter of the said strip as it is withdrawn from the said apparatus.

4. The apparatus of claim 1 wherein the said strip is comprised of a plurality of discrete strips which are releasably interlaced together into a continuous length thereof.

5. The apparatus of claim 4 wherein at least some of said discrete strips are provided with at least one orifice apiece, and wherein said interlacings are respectively formed by passing a part of one discrete strip through the orifice of another discrete strip, the part which has passed through the said orifice being folded back toward said one strip to form a hook.

6. In a film pack for use in cameras, said pack having an exposure aperture and a metering slot, and adapted to receive
   a. a roll of film disposed substantially in the plane of said aperture, but disposed to one side of said exposure aperture, and
   b. a film takeup spool also disposed substantially in the plane of said aperture, but disposed to the opposite side of said exposure aperture, said takeup spool having coupled thereto the lead end of said film from said roll thereof, the improvement comprising
   c. rotary means drivingly coupled to said takeup spool for rotationally driving said spool, and
   d. a roll of flexible strip material wound on said rotary means and threaded through said metering slot, whereby film may be advanced past said exposure aperture, from the roll thereof, to and wound on the takeup spool by pulling the said strip material through the said metering slot.

7. The film pack of claim 6 wherein said strip material has indicia thereon which is so disposed along the length of said strip material that, as said indicia exits from the said slot, it corresponds with and identifies film frames which appear in said exposure aperture.

8. In photographic apparatus having an exposure aperture and slot therein, and containing photographic film therein, the improvement comprising a. rotatable means drivingly coupled to said film for advancing said film past said exposure aperture, and b. a flexible strip wound in a convoluted roll on and about said rotatable means with said strip out of direct engagement with said film, and threadable through said slot to the outside of said photographic apparatus, whereby as the strip is pulled and unwound from said rotatable means, said film is caused to advance past said exposure aperture.

* * * * *